United States Patent [19]
Bakker

[11] Patent Number: 5,117,749
[45] Date of Patent: Jun. 2, 1992

[54] MACHINE FOR THE AUTOMATED PREPARATION OF PIZZAS

[75] Inventor: Evert Bakker, Middletown, Ohio

[73] Assignee: Rykaart, Inc., Hamilton, Ohio

[21] Appl. No.: 619,113

[22] Filed: Nov. 28, 1990

[51] Int. Cl.5 .................. A21C 9/04; A21C 9/08
[52] U.S. Cl. .................... 99/450.1; 99/450.7; 99/494; 118/16; 118/24
[58] Field of Search ........... 99/352, 355, 357, 386, 99/427, 443 C, 450.1, 450.2, 450.7, 494; 222/200, 408.5, 409, 226; 118/16, 24

[56] References Cited

U.S. PATENT DOCUMENTS

| | | |
|---|---|---|
| 788,429 | 4/1905 | Ruf . |
| 2,432,852 | 12/1947 | Arvidson . |
| 3,358,618 | 12/1967 | Vetta .................. 99/450.1 |
| 3,631,818 | 1/1972 | Zito .................... 99/450.1 |
| 3,648,596 | 3/1972 | Zito .................... 99/494 |
| 3,735,692 | 5/1973 | Marchignoni ........ 99/353 |
| 3,760,715 | 9/1973 | Grote et al. ......... 99/494 |
| 3,780,643 | 12/1973 | Papai .................. 99/450.7 |
| 3,840,311 | 10/1974 | Wight .................. 99/450.2 |
| 3,874,641 | 4/1975 | Tolan . |
| 3,892,171 | 7/1975 | Fitch et al. ......... 99/450.7 |
| 4,112,834 | 9/1978 | Thiry .................. 99/494 |
| 4,152,976 | 5/1979 | Kawasaki et al. .... 99/450.1 |
| 4,197,794 | 4/1980 | Raque et al. ........ 99/494 |
| 4,498,635 | 2/1985 | Fielding . |

FOREIGN PATENT DOCUMENTS

| | | |
|---|---|---|
| 382625 | 10/1923 | United Kingdom . |
| 170377 | 2/1905 | Fed. Rep. of Germany . |
| 997386 | 1/1952 | France . |
| 9013229 | 11/1990 | PCT Int'l Appl. ......... 99/450.1 |
| 269077 | 12/1968 | U.S.S.R. .................. 99/450.2 |
| 704346 | 2/1954 | United Kingdom . |
| 2223391 | 4/1990 | United Kingdom ........ 99/450.1 |

Primary Examiner—Timothy F. Simone
Attorney, Agent, or Firm—Wood, Herron & Evans

[57] ABSTRACT

A pizza making machine is disclosed which automates the heretofore manual task of preparing pizzas. The machine includes a sauce and cheese dispenser for topping a pizza therefrom. A pizza supporting platen is included which accommodates three sizes and two shapes of pizza pans, and is powered for movement to below the sauce and cheese dispenser.

16 Claims, 5 Drawing Sheets

MACHINE FOR THE AUTOMATED PREPARATION OF PIZZAS

BACKGROUND OF THE INVENTION

1. Field of the Invention

This invention relates generally to food preparation machines, and more particularly to a machine for automating the preparation of pizzas.

2. Description of the Prior Art

It is conventional to use machines for dispensing various forms of dry, flowable material and for dispensing self-adhering and/or compactable materials. Such machines are particularly useful in the processed food preparation industry for dispensing various types of solid ingredients onto food products passing beneath the dispensing machine. An example of one such machine is disclosed in U.S. Pat. No. 4,498,635 to Fielding.

These dispensing machines may be mounted upon a portable dolly for easy location or relocation of the machine. Or, the machine may be mounted in a fixed location, as a dispensing station along a conveyor system. In either scenario, this conventional solid food dispensing machine is limited in that only solids may be dispensed therefrom. Should a food product require both solid and liquid topping dispensed thereon, a separate liquid topping dispensing machine would have to be utilized, either in portable dolly form or at a different dispensing station along the conveyor system. An example of such a food product is a pizza pie, wherein it is desirable to dispense liquid toppings, such as tomato sauce, and solid toppings, such as cheese, mushrooms, meat and the like, upon pizza dough. It would therefore be desirable, at least for space considerations, to be able to dispense both solid and liquid food toppings from one dispensing assembly.

With the advent of digital circuitry, microprocessors and the like, and the advancements in automatic control systems technology, it has become possible to automate many tasks which have heretofore been manual in nature. Industrial manufacturing in general has been revolutionized by applying these new technologies to automate, for example, fabrication and assembly of numerous products. The food industry can likewise benefit from the application of these same technologies. Specifically, the preparation of food items wherein several discreet steps are required in order to produce an end food product may be automated with the proper blending of machinery, control system, and computer. An example of just such a food item is the pizza pie, wherein liquid and solid toppings are sequentially applied to a pizza dough.

It has therefore been one object of the present invention to provide a food topping dispensing assembly wherein both solid and liquid food toppings may be dispensed therefrom.

Another object of the present invention has been to provide a liquid and solid food topping dispensing assembly which may be used in conjunction with a food supporting platen to dispense toppings thereon.

Yet another object of the present invention has been to provide means by which a food supporting platen and a liquid and solid material topping assembly may be moved one with respect to the other such that liquid and solid toppings may be dispensed upon foods atop the platen when the platen is moved beneath the dispensing assembly.

A further object of the present invention has been to automate the heretofore manual task of preparing pizzas.

SUMMARY OF THE INVENTION

The present invention is a pizza making machine comprising a machine frame, a dispensing assembly mounted on the frame for dispensing both liquid and solid pizza toppings, a pizza supporting platen, and means for effecting relative movement between the topping dispensing assembly and the platen.

The dispensing assembly is comprised of two separate subassemblies: a solid topping dispensing chute, and a liquid topping dispensing tube. The solid topping dispensing chute employs horizontally spaced converging perforated metal plates which are reciprocally movable with respect to one another. These reciprocally movable plates serve to force solid pizza topping through the perforations, for depositation on a surface below. The solid topping dispensing chute further includes means for adjusting the width of the chute, so that one may selectively vary a field width of the solid topping dispensed from the chute. The liquid topping dispensing tube is located beneath the solid topping dispensing chute. It employs an inner fixed tube having slots along its length, and an outer rotatable tube having rows of holes along its length, with each row of holes being of a progressively greater length. By rotating the outer tube with respect to the inner tube, the desired liquid topping field width may be selected for depositation of the liquid topping on a surface below.

The pizza supporting platen of the present invention includes means for sensing physical characteristics of a pan placed atop the platen. Pan characteristics ascertainable by the platen sensing means include size and shape of the pan placed atop the platen.

The present invention further includes means for effecting differing relative movement between the pizza topping dispensing assembly and the pizza supporting platen in response to differing signals derived from the pizza supporting platen sensing means. This enables the platen to be moved to below the dispensing assembly, and for liquid and solid toppings to be dispensed thereon, with the manner of dispensation depending on the shape of the pan.

One advantage of the present invention is that both solid and liquid food toppings may be dispensed from a single dispensing assembly.

Another advantage of the present invention is that a liquid and solid food topping dispensing assembly may be used in conjunction with a food supporting platen to dispense toppings thereon.

Yet another advantage of the present invention is that a liquid and solid food topping dispensing assembly may be moved with respect to a food supporting platen such that toppings may be dispensed upon foods atop the platen when the platen is moved beneath the dispensing assembly.

A further advantage of the present invention is that the heretofore manual task of preparing pizzas has now been automated and simultaneously, made mistake proof.

These and other objects and advantages of the present invention will become more readily apparent during the following detailed description as reference is made to the drawings herein, in which:

DESCRIPTION OF THE PREFERRED EMBODIMENTS

Figure 1:
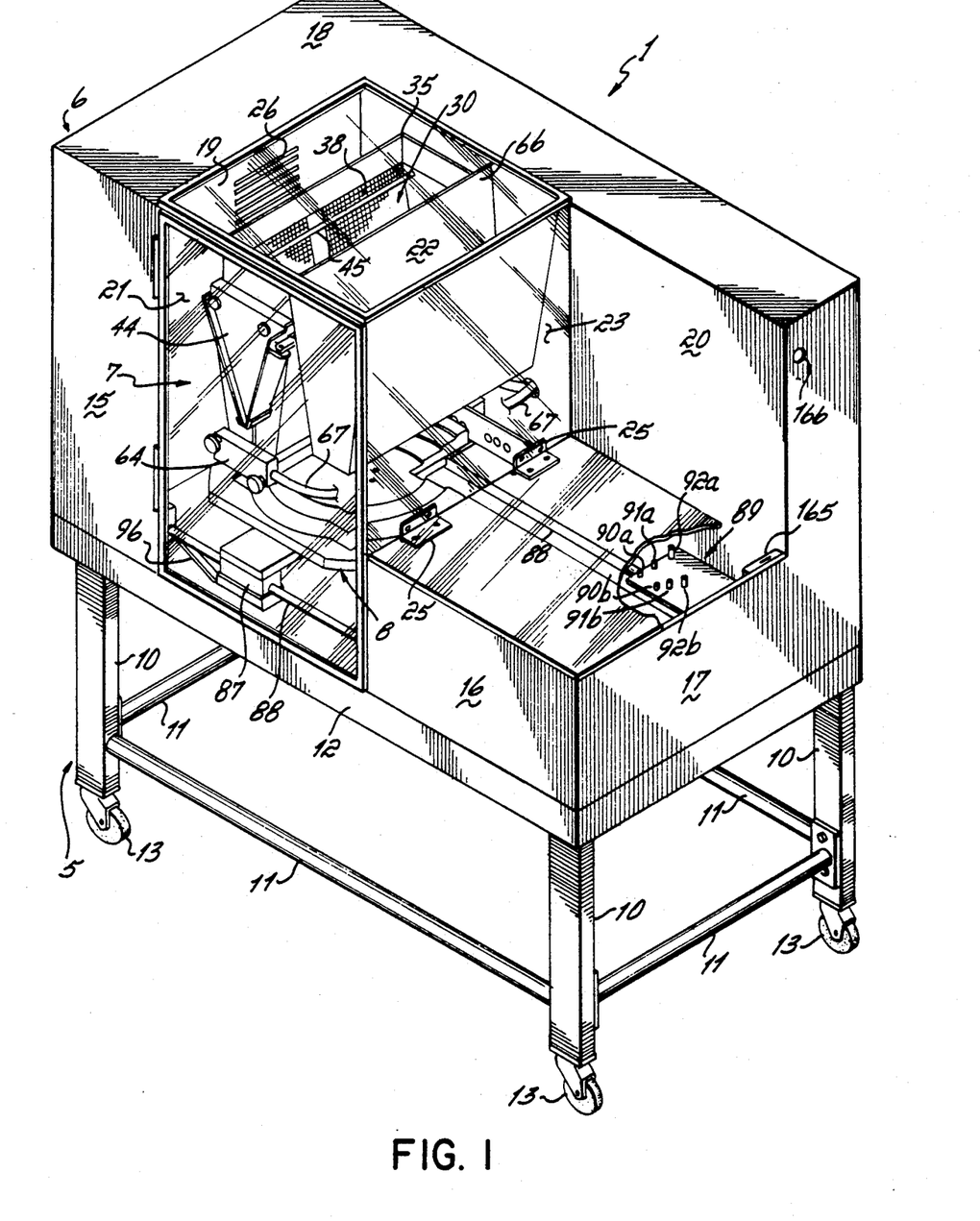
FIG. 1 is a perspective view of the pizza making machine which is the subject of this application.

Referring first to FIG. 1, there is illustrated a pizza making machine 1 for the automated preparation of pizzas. The machine 1 includes a support frame 5, a housing 6, a solid and liquid pizza topping dispensing assembly 7 and a movable platen 8. With exceptions noted hereafter, these main components of the machine 1 are preferably fabricated of stainless steel so that the machine 1 may easily be kept in a sanitary condition and free from corrosion.

The support frame 5 is comprised of vertical legs 10 connected by horizontal braces 11. Atop the vertical legs 10 is a housing-receiving frame 12. The vertical legs 10 sit atop casters 13 for ease of moving the machine 1 about a work area.

The housing 6 is constructed of a plurality of sheet metal panels. The front of the housing includes panels 15 and 16, with the rear of the housing being comprised of a single panel (not shown). The sides of the housing are comprised of a single rectangular left panel (not shown) and an L-shaped right side panel 17. The top of the housing is comprised of a single L-shaped panel 18. Interior left side panel 19 and rear panel 20 complete the sheet metal portion of the housing.

The dispensing assembly 7 is surrounded by plexiglass panels 21, 22 and 23 which enable one to visually monitor the functioning of the machine 1. Plexiglass panel 21 completes the front of the housing 6 and plexiglass top panel 22 completes the top of the housing 6. Right side plexiglass panel 23 exposes the side of the dispensing assembly 7. A fourth plexiglass panel 24 exposes the platen and platen travel area, and allows access to the platen by way of hinges 25 which connect the panel 24 to the lower edge of the panel 23.

Contained within the left side of the housing 6, and not shown in the drawings, is a refrigeration unit for maintaining the pizza ingredients in a refrigerated state. The refrigerator unit is vented into the dispenser interior via vents 26 in interior panel 19.

Figures 2, 5:
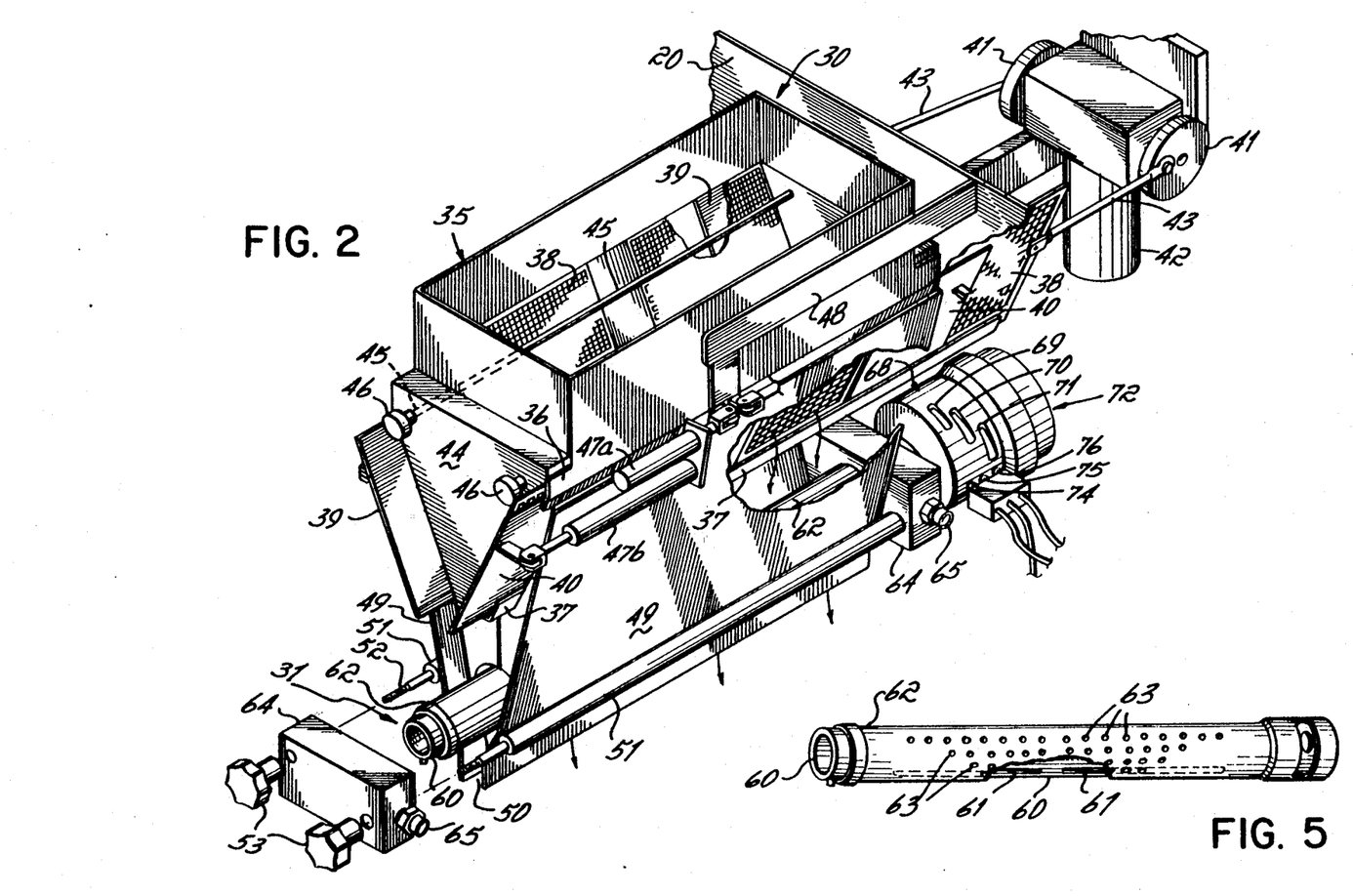
FIG. 2 is a perspective view of the solid and liquid pizza topping dispenser assembly included within the pizza making machine of the present invention.
FIG. 5 is a perspective view of the liquid pizza topping dispenser tube.

With reference now to FIGS. 1 and 2, it will be seen that the solid and liquid pizza topping dispensing assembly 7 comprises a solid topping dispensing chute 30 and a liquid topping dispensing tube 31. The solid topping chute 30 is comprised of an open top and bottom box structure 35 cantilevered off of interior panel or sidewall 20 of the housing 6. The box structure 35 includes inwardly bent bottom edges 36 which are cooperable with an upturned channel section 37, likewise cantilevered off of the sidewall 20, to serve as guides for a pair of reciprocating perforated metal plates 38,38 and two pairs of solid topping field width determining sheet metal plates 39,39 and 40,40. Each plate pair 39,39 and 40,40 effectively functions as a solid topping "gate." The perforated reciprocating plates 38,38 are eccentrically connected to spindles 41,41 of an electric motor 42 by tie rods 43,43. The tie rod-to-spindle connections are 180° out of phase, thereby causing the plates 38,38 to reciprocate one with respect to the other as the spindles 41,41 rotate. The ends of the chute 30 are formed from triangular-shaped plastic blocks 44,44. These plastic blocks 44,44 have holes therein (not shown) through which are inserted rods 45,45 which are cantilevered off the sidewall 20 of the housing 6 and which have threaded thereon knobs 46,46 for securing the box structure 35 to the sidewall 20. To actuate the pairs of the field width determining sheet metal plates 39,39 and 40,40, pneumatic cylinders are employed. Four pneumatic cylinders (only two cylinders 47a, 47b of which are shown) per plate pair or gate are employed in series and are suspended from L-shaped cantilevered support braces 48,48. A pair of solid sheet metal plates 49,49 complete the solid topping dispensing chute 20 and are located outboard of the reciprocating plates 38,38. These solid sheet metal plates 49,49 are downwardly converging, and direct solid toppings previously forced through the perforated reciprocating plates 38, 38 downwardly and through an opening 50 defined by these plates 49,49. These outboard plates 49,49 have attached thereto horizontally oriented tubes 51,51 through which are inserted rods 52,52 which are cantilevered off the sidewall 20 of the housing 6 and which have threaded ends onto which are threaded knobs 53,53 for securing the outboard plates 49,49 in place.

With reference now to FIGS. 1, 2 and 5, it will be seen that the liquid topping dispensing tube 31 is comprised of an inner fixed tube 60 having slots 61 along its length, and an outer rotatable tube 62 having rows of holes 63 along its length, with each row being of a different length. Referring now to FIG. 2, it will be seen that the inner fixed tube 60 is captured on its ends within mounting blocks 64,64 which are secured to either ends of the tubes 51,51 on the outboard plates 49,49 via the aforementioned threaded rods 52,52 and knobs 53,53. Liquid pizza topping is supplied under pressure to the inner fixed tube 60 through supply ports 65,65 in the mounting blocks 64,64. Referring now back to FIG. 1, there is illustrated a liquid topping tank 66 for storing liquid toppings therein which may be pumped via a pump 55 (shown only in schematic FIG. 7) through supply lines 67,67 to the input ports 65,65. Connected to one end of the liquid topping dispensing tube 31 is an indexing drum 68 having staggered slots 69,70,71 therein and which is driven by a pneumatic motor 72. Cooperable with these staggered slots 69,70,71 of the indexing drum 68 is a three pin pneumatic switch 73 having pins 74,75,76 movable within these slots.

Figure 3:
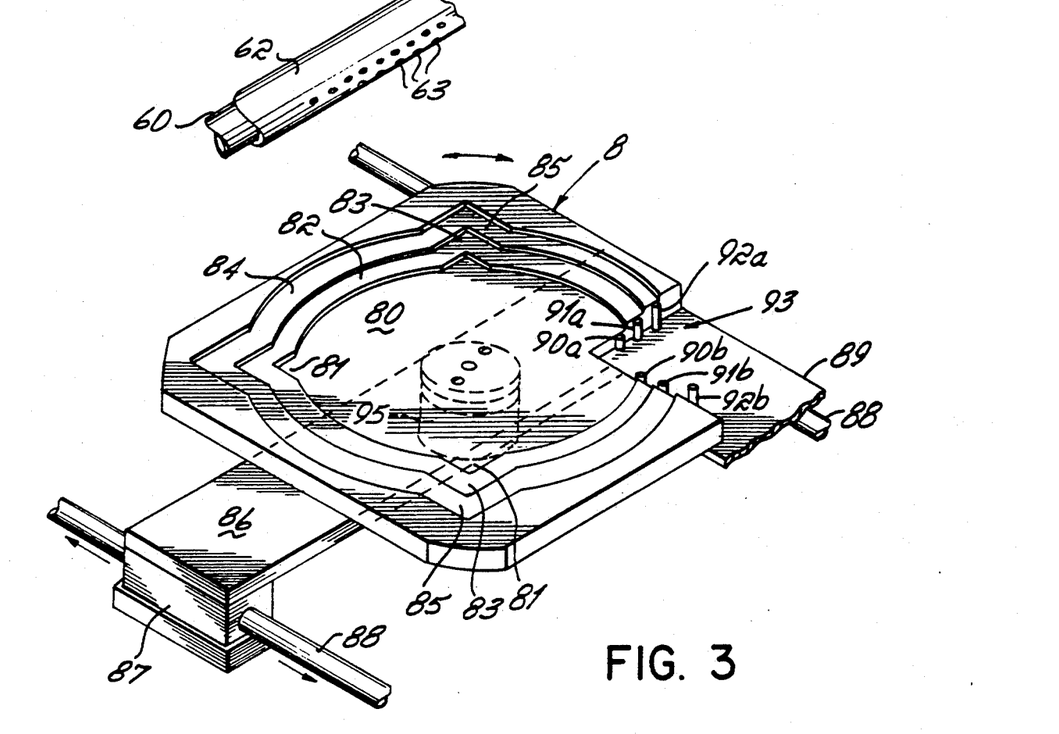
FIG. 3 is a perspective view of the pizza supporting platen.
Figure 4:
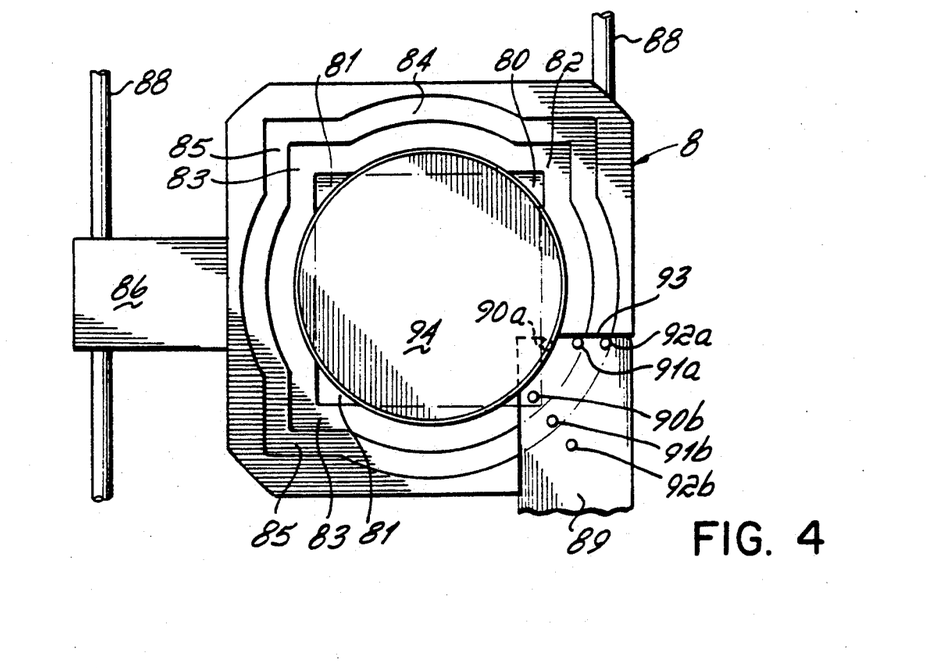
FIG. 4 is a top view of the pizza supporting platen.

Referring now to FIGS. 1, 3 and 4, it will be seen that the platen 8 is essentially a square plastic plate into which is machined a series of differing depth recessed surfaces wherein the platen may accommodate both square and round pizza pans of three sizes. Referring to FIGS. 3 and 4, it will be seen that the platen 8 has machined therein a lowermost depth recessed surface 80 which is essentially circular in nature but which also includes three triangular corners 81,81,81. With this configuration, the platen may accommodate on this lowermost recessed circular surface 80 a circular pan equal in diameter to the diameter of this circular recess or a square pan of a size wherein the corners of the pan will fit within the corners 81,81,81. This lowermost platen surface 80 is designated a "small" size. The platen also includes an intermediate depth circular recessed surface 82 similar to the lowermost platen surface 80 but wherein its circular feature is of a larger diameter. In addition, this intermediate platen surface 82 includes triangular corners 83,83,83. This intermediate platen surface 82 may accept either a square or a round pan designated a "medium" size. Lastly, the platen includes an uppermost shallow recessed surface 84 again including triangular corners 85,85,85, into which is acceptable either a square or a round pan of a "large" size.

This platen 8 is mounted for rotation via a pneumatic motor 95 upon a transverse support plate 86. This transverse support plate 86 is itself mounted to a pneumatically actuated pillow block or rodless cylinder 87 which rides over rail 88; the other side of the transverse support plate 86 includes a roller or wheel (not shown) which rides atop a similar rail 88. This allows the platen to move beneath the dispensing assembly 7. A pneumatically actuated stop or block 96 is cooperable with the pillow block 87 and provides a mechanical stop for same.

A small plate 89 is fixedly attached to the interior sidewall 20 in a rearwardmost location. This plate 89 has mounted thereatop three pairs of proximity switches 90a,90b, 91a,91b, 92a,92b. As seen in FIG. 3, these three pairs of proximity switches 90a,90b, 91a,91b, 92a,92b are located within a rectangular cut-out corner portion 93 of the platen 8. Each proximity switch is operable to sense a particular size and shape of a pizza pan placed atop the corresponding platen surface. For example, when a circular pizza pan 94 of small size is placed upon the lowermost platen surface 80, the proximity switch 90a associated with the lowermost platen surface 80 is activated. On the other hand, should a square pizza pan of small size be placed atop the lowermost platen surface 80, the switch 90b which correspond to the lowermost platen surface 80 is activated. Since the platen surfaces 80,82,84 are displaced vertically with respect to one another, and the switches associated with each surface can only be activated by a pan which fits into the recess with which the switches are associated, a pizza pan of a particular size will only activate that switch associated with its particular size. In this manner, the machine 1 may sense the size and shape of the pizza pan with dough therein on which is to be dispensed solid and liquid pizza toppings from the dispensing assembly 7.

Figure 6:
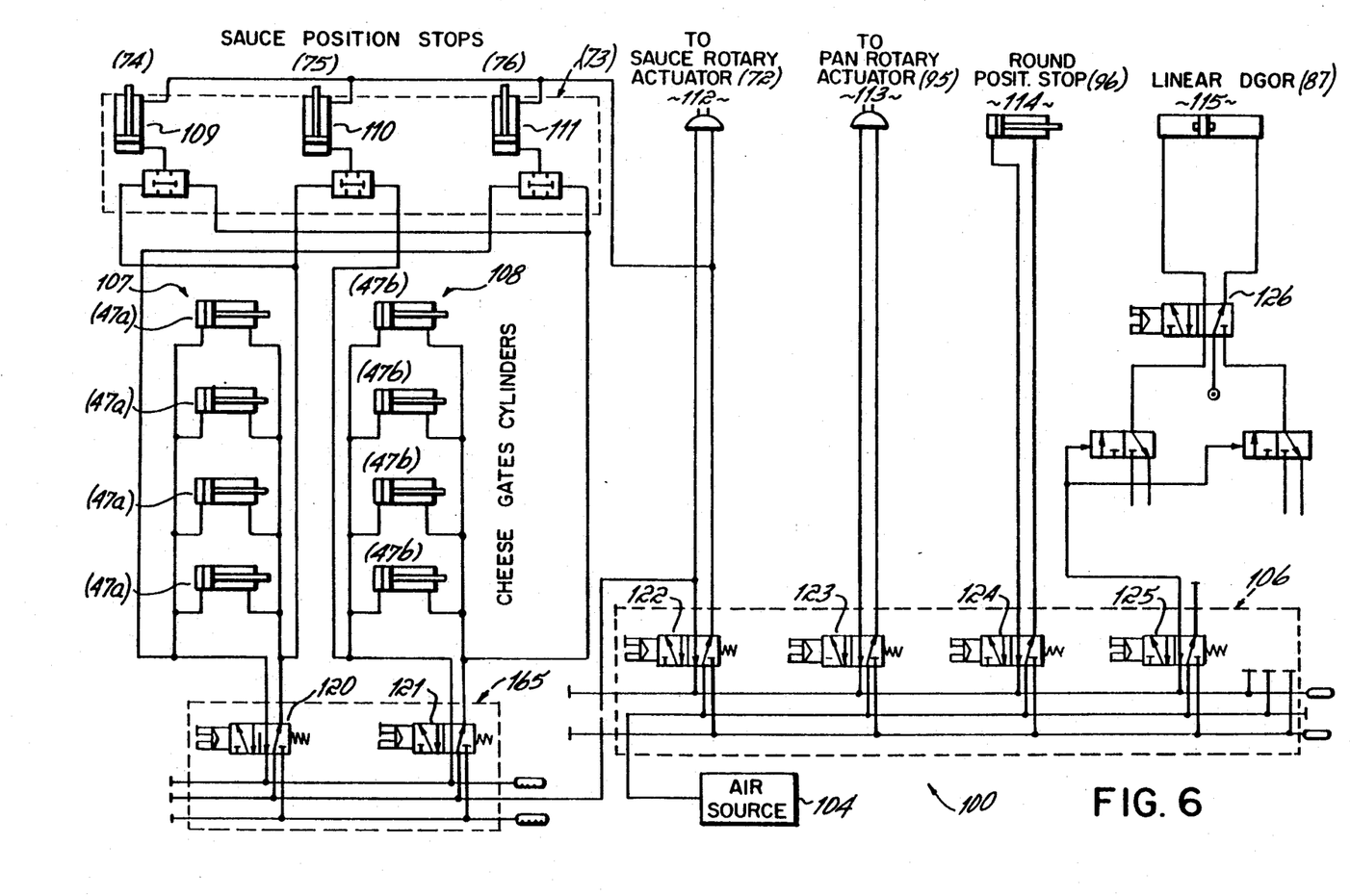
FIG. 6 is a schematic of an appropriate pneumatic circuit.
Figure 7:
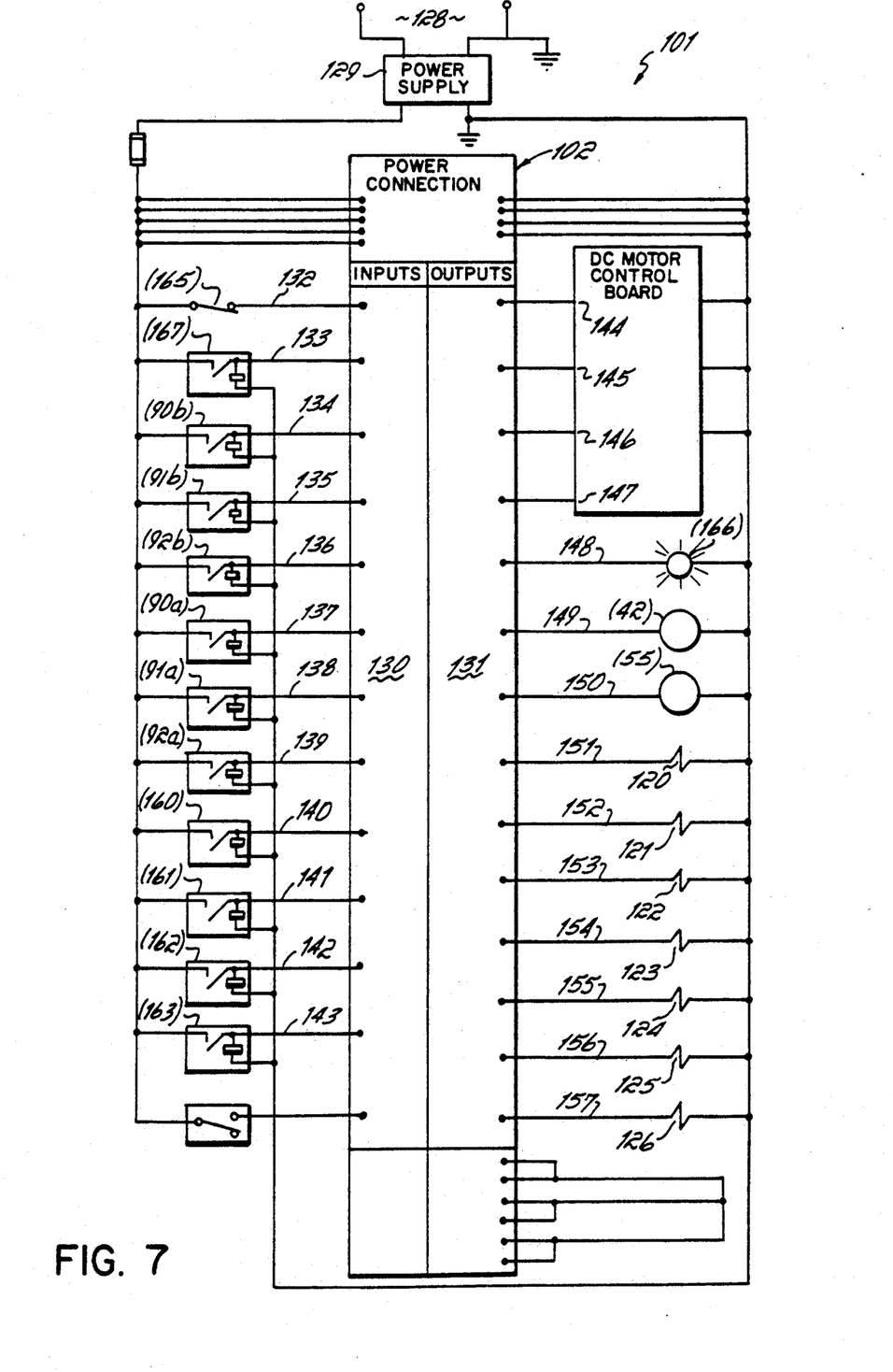
FIG. 7 is a schematic of an appropriate electrical control logic circuit.

With reference to FIGS. 6 and 7, there is illustrated a pneumatic circuit 100 and an electrical control logic circuit 101, respectively for controlling and actuating the machine 1. (The numbers in parenthesis correspond to the hardware associated with the machine 1 and illustrated in FIGS. 1-5.)

Referring first to FIG. 6, the pneumatic circuit 100 is supplied by an air source 104 and includes a two station manifold 105 and a five station manifold 106. The two station manifold 105 regulates flow to a bank of four 25mm hydraulic cheese gate cylinders 107 and a bank of four 50mm hydraulic cheese gate cylinders 108 via solenoids 120 and 121. The two station manifold 105 further regulates flow for three sauce position stops 109, 110, and 111. The pneumatic cylinders 47a, 47b (FIG. 2) include one each of the 25mm and 50mm cylinders from the cylinder banks 107 and 108. The three sauce position stops 109, 110, and 111 actuate the pins 74, 75, 76 of the pneumatic pin switch 73 (FIG. 2).

The five station manifold 106 regulates flow to the sauce rotary actuator 112, the pan rotary actuator 113, the round pan position stop 114, and the linear DGOR (rodless cylinder) 115 via solenoids 122, 123, 124, 125 and 126. The sauce rotary actuator 112 actuates the drum 68 (FIG. 2). The pan rotary actuator 113 actuates the motor 95 (FIG. 3). The round pan position stop 114 actuates the stop 96 (FIG. 1), and the linear DGOR 115 actuates the pneumatic pillow block 87 (FIG. 3).

Referring now to FIG. 7, the electrical control circuit 101 includes a 120 volt AC input 128 which drives a 24 volt DC power supply 129 and has a plurality of inputs 130 which, when channeled through control logic software 102, generate a plurality of outputs 131.

The inputs 130 for the circuit 101 are the following: door switch signal on lead 132, load position proximity switch signal on lead 133, small square pan proximity switch signal on lead 134, medium square pan proximity switch signal on lead 135, large square pan proximity switch signal on lead 136, small round pan proximity switch signal on lead 137, medium round pan proximity switch signal on lead 138, large round pan proximity switch signal on lead 139, round pan stop proximity switch signal on lead 140, counter proximity switch for position signal on lead 141, cylinder block proximity switch signal on lead 142, and counter proximity switch for cheese signal on lead 143.

The outputs 131 generated by the control circuit 101 are the following: four sauce motor and cheese motor speed signals on leads 144, 145, 146, and 147, pan loaded light signal on lead 148, cheese motor relay signal on lead 149, sauce motor relay signal on lead 150, 25mm and 50mm cheese gate cylinder signals on leads 151 and 152, sauce rotary and pan rotary actuator valve signals on leads 153 and 154, round pan cylinder stop valve signal on lead 155, cylinder block speed control signal on lead 156, and cylinder block direction signal on lead 157. The motor speed signals on leads 144, 145, 146 and 147 correspond to small square pan, medium square/small round pans, large square/medium round pans, and large round pan respectively.

Describing now the operation of the present invention, the solid pizza topping chute 30 is first loaded with the desired topping, such as cheese. Next, the liquid pizza topping tank 66 is filled with the desired liquid topping, such as tomato sauce. A pizza pan of either small, medium or large size, being either round or square, and containing pizza dough is then placed atop the platen 8, and the platen cover 24 is closed. The cover or door switch 165 (shown only in schematic FIG. 7) and load position proximity switch 167 (shown only in schematic FIG. 6) send signals on leads 132 and 133 to the logic circuit 101; the control software 102 sends a signal on lead 148 activating the pan loaded light 166. The switch associated with the pan's size and shape generate input signals containing this information for input to the electrical control logic circuit 101.

Assuming that the pan is circular and "small," the proximity switch 90a sends a signal 137 to the logic circuit 101. The control software 102 generates signals on leads 156 and 157 which actuate solenoids 125 and 126, providing pressure at 115. The pneumatic cylinder block or rodless cylinder 87 is thereby activated to translate the platen 8 with pan 94 thereatop such that the center of the pan with dough therein is moved beneath the liquid topping dispensing tube 31 and solid topping dispensing chute 30. A proximity switch 160 (shown only in schematic FIG. 7) sends an input signal on lead 140 to the control circuitry. The software 102 generates a signal on lead 155 which actuates solenoid 124 providing pressure at 114 to engage the manual stop 96 which stops the cylinder block 87 and platen 8 thereon.

The control software 102 further generates signals on leads 149, 150, 151, 152, 153 which actuate the cheese motor 42 and sauce motor 55 (shown only in schematic FIG. 7) and actuate solenoids 120, 121, and 122. The speeds of the motors are determined by output signals on lead 145. The solenoids provide pressure at 107, 108, 109 and 112. The pin 76 of the pneumatic pin switch 73 which is associated with the "small" size is advanced outwardly, as the pneumatic motor 72 rotates the indexing drum 68 and outer rotating tube 62 therewith clockwise. As this indexing drum 68 rotates, the pin 76 slips into engagement with the slot 71 of the drum 68. By doing so, the outer rotating tube 62 with holes 63 therein is positioned so as to dispense a field width from which tomato sauce may flow which is appropriate for the diameter of the "small" size pan atop the platen 8.

The signal on lead 150 relayed as an output from the control software 102 to the tomato sauce pump motor 55 (shown only in schematic FIG. 7) causes sauce to be pumped from the liquid topping tank 66 through the supply lines 67,67 to the supply ports 65,65 of the mounting blocks 64,64. Tomato sauce is supplied to either end of the inner fixed tube 60 of the dispensing tube assembly 31, and flows through the slots 61 in this inner tube 60. The sauce next flows through the holes 63 in the outer tube 62 which are aligned with the slots 61 in the inner tube 60. As previously mentioned, this row of holes has a width appropriate for the diameter of the pizza pan placed atop the platen 8.

The control software output signal on lead 154 actuates solenoid 123 providing pressure at 113 for the pneumatic motor 95 upon which the platen 8 is mounted for rotation. While sauce is supplied to the inner tube 60 of the tube assembly 31, this motor simultaneously rotates the platen 8 through 180°, thereby completely covering the dough contained within the pan atop the platen with sauce. The proximity switch 160 (shown only in schematic FIG. 7) mounted beneath the platen 8 senses the completion of this 180° travel and sends an input signal on lead 140 to the control software 102 which generates an output signal on lead 154 deactuating solenoid 123, thereby ceasing pressure at 113 and stopping the motor 95. The control software 102 then sends signals 151, 152 and 153 to solenoids 120, 121 and 122 and hence to the pneumatic motor 72 and the pneumatic pin switch 73 causing the pin 76 to recede out of the slot 71 of the drum 68 while the motor 72 simultaneously rotates the drum 68 and outer tube 62 counterclockwise to a closed position, thereby terminating the flow of sauce from the dispensing tube 31.

Next the control software 102 sends a signal 149 to the motor 42 and activates same, thereby causing the perforated plates 38,38 to begin reciprocating. Simultaneously, the control circuitry sends a signal to the pneumatic cylinders 47a,47b which adjust the pairs of plates 39,39 and 40,40 such that the exposed width of the perforated plates 38,38 is approximately equal to the diameter of the pan therebelow. As these reciprocating perforated plates 38,38 move relative to each other, the material contained within the box structure 35 is gravitationally advanced downwardly, and these plates 38,38 tend to shear or otherwise separate the granulated topping contained therebetween. Continued shearing action of the plates 38,38 causes this solid topping material to pass through the perforations and fall by gravity downwardly to the outboard plates 49,49, which further channel this solid material downwardly and through the opening 50.

An output signal on lead 154 from the control software 102 to the solenoid 123 and hence the motor 95 upon which the platen 8 is mounted causes the platen to simultaneously rotate in the opposite direction 180° thereby providing full coverage of the pizza dough and sauce thereon with solid topping material. When the platen 8 has completed its 180° rotation, the proximity switch 160 (shown only in schematic FIG. 7) mounted beneath the platen 8 generates an input signal from which the control software generates an output signal on lead 149 which ceases operation of the motor 42 and hence the deposit of solid topping from the chute 30. Signals on leads 156 and 157 are then sent by the control software 102 to the solenoids 125 and 126 activating the cylinder block or rodless cylinder 87 to translate the platen rearwardly to its original position, such that one may then open the platen cover 24 and remove the pizza pan therefrom.

Assuming now that the pan placed atop the platen is square and "small," the platen proximity switch 90b senses the pan's size and shape, and relays an input signal 134 containing this information to the control software which in turn sends output signals on leads 156 and 157 to the solenoids 125 and 126 and hence to the pneumatic cylinder block 87, activating it such that the platen and pan thereon with dough therein are translated to a position where the leading, or forwardmost edge of the pan is directly beneath the liquid topping dispensing tube 31 and solid topping dispensing chute 30. A proximity switch 161 (shown only in schematic FIG. 7) mounted on the sidewall 20 of the housing 6 then generates an input signal on lead 141 from which the control software 102 generates output signals on leads 156 and 157 deactuating the solenoids 125 and 126 and hence bringing the platen 8 to a stop. The control software 102 generates output signals on leads 149, 150, 151, 152, 153 which engage the cheese motor 42 and the sauce motor 55 (shown only in schematic FIG. 7) and actuate solenoids 120, 121, and 122. The speeds for the motors are selected by the output signal on lead 145. The solenoids provide pressure at 107, 108, 109 and 112. The pin 76 of the pneumatic pin switch 73 engages the slot 71 of the drum 68 as the pneumatic motor 72 rotates the drum 68 and outer rotating tube 62 therewith clockwise. As before, this outer rotating tube 62 thereby provides a field width from which tomato sauce may flow equal to the width of the small square pan atop the platen 8.

The signal on lead 150 relayed as an output to the tomato sauce pump 55 (shown only in schematic FIG. 7) causes the sauce to be pumped from the liquid topping tank 66 to the dispensing tube assembly 31. As the sauce flows through the holes 63 in the outer tube 62, the control software 102 supplies output signals 156 and 157 to the solenoids 125 and 126 and hence to the pneumatic cylinder block 87. As sauce is supplied to the inner tube 60 of the tube assembly 31, and as this sauce flows therefrom, the pneumatic cylinder block 87 translates the platen 8 beneath the tube assembly 31, thereby completely covering the dough contained within the square pan atop the platen 8 with sauce. A proximity switch 162 (shown only in schematic FIG. 7) mounted on the sidewall 20 of the housing 6 generates an input signal on lead 141 upon completion of this travel, and the control software 102 generates signals on leads 156 and 157, deactuating solenoids 125 and 126, and thus ceasing platen translation. The control software 102 then sends an output signal on lead 153 to the solenoid 122 and hence to the motor 72, causing the tube 62 to be rotated counterclockwise to a closed position.

Next the control software 102 sends an activating signal on lead 149 to the motor 42 to cause the perforated plates 38,38 to begin reciprocating. As cheese is dispensed from the chute assembly 30, the pneumatic cylinder block 87 is actuated by the solenoids 125 and 126 in response to output signals on leads 156 and 157 and translates the platen 8 back underneath the chute assembly 30, thereby providing full coverage of the pizza dough with sauce thereon with the solid topping material. When the platen 8 has completed traversing back underneath the dispensing assembly 30, a proximity switch 163 (shown only in schematic FIG. 7) sends an input signal on lead 143 to the control software 102 which in turn generates an output signal on lead 149 to the motor 42, causing it to cease operation; signals on leads 156 and 157 are then sent by the control software 102 to the solenoids 125 and 126 and hence to the cylinder block 87 which translate the platen 8 rearwardly to its original position such that one may open the platen cover 24 and remove the pizza pan therefrom.

As previously mentioned, the proximity switch equipped platen 8 may accommodate either a small, medium or large size pan. The control system is operable to accept signals from any of the three proximity switch pairs to control movement of the platen 8 to beneath the assembly, and to cause either rotation or straight line translation depending on the shape of the pan; furthermore the control system, as previously described, automatically controls the field width of both the solid topping dispensing chute 30 and the liquid topping dispensing tube 31.

While only one embodiment of the invention has been described, those skilled in the art will readily recognize adaptations and modifications which may be made to the present invention without departing from the spirit or the scope of the appended claims. Accordingly, the invention is to be limited only by the following claims.

What is claimed is:

1. A pizza making machine comprising
a machine frame,
a dispensing assembly mounted upon said frame for sequentially dispensing both liquid and solid pizza topping materials,
a pizza supporting platen adapted to receive dough containing pizza pans, and
means for effecting relative movement between said dispensing assembly and said platen such that said liquid topping is dispensed upon the top of dough contained in pizza pans on said platen when said platen is moved in a first direction beneath said dispensing assembly and said solid topping is dispensed upon said platen when said platen is moved in an opposite direction.

2. The pizza making machine of claim 1 wherein said dispensing assembly comprises
a solid topping dispensing chute, and
a liquid topping dispensing tube located beneath said chute.

3. The pizza making machine of claim 2 wherein said liquid topping dispensing tube comprises
an inner fixed tube having slots therealong, and
an outer rotatable tube having rows of holes therein, each said row of holes being of differing length, wherein when liquid topping is supplied to said inner tube said outer tube may be rotated to determine a desired field width of said liquid topping.

4. The pizza making machine of claim 2 wherein said solid topping dispensing chute comprises
horizontally spaced converging perforated metal plates, said plates being reciprocally movable with respect to each other and operable to force solid pizza topping therethrough, and
means for adjusting the effective width of said chute so as to vary a field width of said solid topping dispensed from said chute.

5. The pizza making machine of claim 1 wherein said pizza supporting platen includes means for sensing physical characteristics of a pan placed thereatop, said characteristics including size and shape of said pan.

6. The pizza making machine of claim 5 which further includes means for effecting differing relative movement between said dispensing assembly and said platen in response to differing signals derived from said sensing means.

7. A pizza making machine comprising
a machine frame,
a dispensing assembly mounted upon said frame for dispensing both liquid and solid pizza topping materials,
a pizza supporting platen adapted to receive dough containing pizza pans, and
means for effecting relative movement between said dispensing assembly and said platen such that said toppings may be dispensed upon the top of dough contained in pizza pans on said platen when said platen is positioned beneath said dispensing assembly, said dispensing assembly comprising
a solid topping dispensing chute, and
a liquid topping dispensing tube oriented generally horizontally and located beneath said chute, said liquid topping dispensing tube being operable to dispense liquid toppings along its length.

8. The pizza making machine of claim 7 wherein said liquid topping dispensing tube comprises
an inner fixed tube having slots therealong, and
an outer rotatable tube having rows of holes therein, each of said row of holes being of differing length, wherein when liquid topping is supplied to said inner tube said outer tube may be rotated to determine a desired field width of said liquid topping.

9. The pizza making machine of claim 7 wherein said solid topping dispensing chute comprises
horizontally spaced converging perforated metal plates, said plates being reciprocally movable with respect to each other and operable to force solid pizza topping therethrough, and
means for adjusting the effective width of said chute so as to vary a field width of said solid topping dispensed from said chute.

10. The pizza making machine of claim 7 wherein said pizza supporting platen includes means for sensing physical characteristics of a pan placed thereatop, said characteristics including size and shape of said pan.

11. The pizza making machine of claim 10 which further includes means for effecting differing relative movement between said pizza topping dispensing assembly and said pizza supporting platen in response to differing signals derived from said sensing means.

12. A pizza making machine comprising
   a dispensing assembly for dispensing a liquid pizza topping material,
   a pizza supporting platen adapted to receive dough containing pizza pans,
   means for effecting relative movement between said dispensing assembly and said platen, such that said liquid topping may be dispensed upon the top of dough contained in pizza pans on said platen when said platen is located beneath said dispensing assembly, said liquid dispensing assembly including a liquid topping dispensing tube comprising
   an inner fixed tube having slots therealong, and
   an outer rotating tube having rows of holes therein, each said row of holes being of differing length, wherein when liquid topping is supplied to said inner tube said outer tube may be rotated to determine a desired field width of said liquid topping.

13. The pizza making machine of claim 12 wherein said pizza supporting platen includes means for sensing the size and shape of a pan placed atop said platen.

14. The pizza making machine of claim 13 which further includes means for effecting differing relative movement between said pizza topping dispensing assembly and said pizza supporting platen in response to differing signals derived from said platen sensing means.

15. A pizza making machine comprising
   a dispensing assembly for dispensing pizza topping materials,
   a pizza supporting platen adapted to receive dough containing pizza pans,
   means for effecting relative movement between said dispensing assembly and said platen, such that said toppings may be dispensed upon the top of dough contained in pizza pans on said platen when said platen is moved beneath said dispensing assembly, and
   said pizza supporting platen including means for sensing the size and shape of a pan placed atop said platen.

16. The pizza making machine of claim 15 which further includes means for effecting differing relative movement between said pizza topping dispensing assembly and said pizza supporting platen in response to differing signals derived from said platen sensing means.

* * * * *